(12) United States Patent
Iwamoto

(10) Patent No.: US 9,733,521 B2
(45) Date of Patent: Aug. 15, 2017

(54) LIQUID CRYSTAL DISPLAY APPARATUS

(71) Applicant: STANLEY ELECTRIC CO., LTD., Meguro-ku, Tokyo (JP)

(72) Inventor: Yoshihisa Iwamoto, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 4 days.

(21) Appl. No.: 14/638,588

(22) Filed: Mar. 4, 2015

(65) Prior Publication Data
US 2015/0261049 A1    Sep. 17, 2015

(30) Foreign Application Priority Data

Mar. 11, 2014 (JP) ................................. 2014-048226

(51) Int. Cl.
*G02F 1/1337* (2006.01)
*G02F 1/1343* (2006.01)

(52) U.S. Cl.
CPC .. *G02F 1/133707* (2013.01); *G02F 1/134327* (2013.01); *G02F 1/134309* (2013.01)

(58) Field of Classification Search
CPC ......... G02F 1/133707; G02F 1/134327; G02F 1/1343; G02F 1/134309; G02F 2201/40; G09G 3/04; G09G 3/18
USPC ............... 349/139, 142, 147; 345/33, 34, 38
See application file for complete search history.

(56) References Cited

U.S. PATENT DOCUMENTS

| | | | | |
|---|---|---|---|---|
| 6,816,223 | B2* | 11/2004 | Sugiyama | G02F 1/133707 349/129 |
| 7,050,134 | B2* | 5/2006 | Song | G02F 1/133707 349/129 |
| 2009/0201449 | A1* | 8/2009 | Nishida | G02F 1/134363 349/114 |
| 2012/0147313 | A1* | 6/2012 | Kobayashi | G02F 1/133707 349/139 |
| 2013/0342802 | A1* | 12/2013 | Iwamoto | G02F 1/13439 349/142 |

FOREIGN PATENT DOCUMENTS

| | | | |
|---|---|---|---|
| JP | 2004252298 A | 9/2004 | |
| JP | 2009122271 A | 6/2009 | |

\* cited by examiner

*Primary Examiner* — Angela Davison
(74) *Attorney, Agent, or Firm* — Holtz, Holtz & Volek PC

(57) ABSTRACT

To provide a technique that prevents electrode disconnection in a liquid crystal display apparatus comprising a plurality of openings in an electrode. The apparatus comprises a first substrate, a second substrate, a first electrode, a second electrode, and a liquid crystal layer. The first electrode comprises first openings and the second electrode comprises second openings. Each first opening is disposed forming columns so that the respective longitudinal directions align with a first direction, and comprises two short-side edges that obliquely cross the first direction at an angle other than orthogonal. Each opening is disposed forming columns so that the respective longitudinal directions align with the first direction, and comprises two short-side edges that obliquely cross the first direction at an angle other than orthogonal. The first openings and second openings are alternately disposed column by column along a second direction that crosses the first direction.

6 Claims, 7 Drawing Sheets

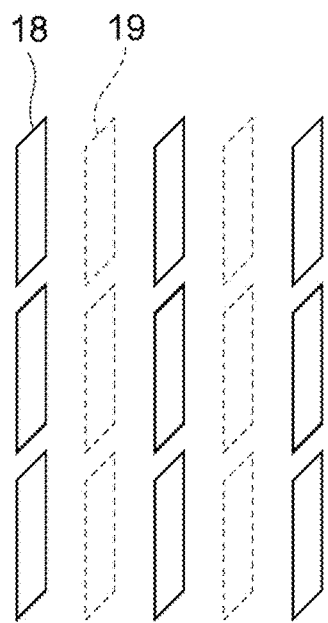
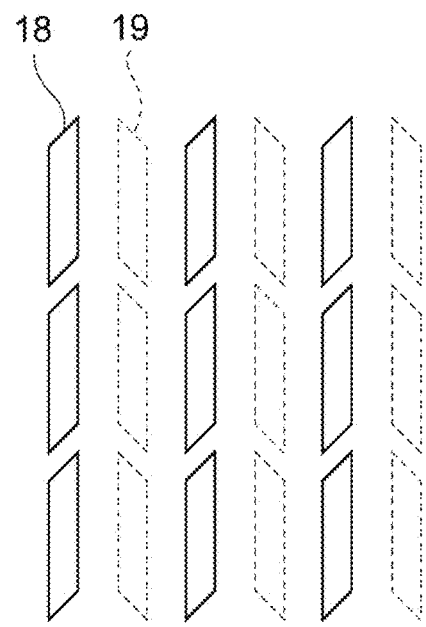
Fig. 2A              Fig. 2B
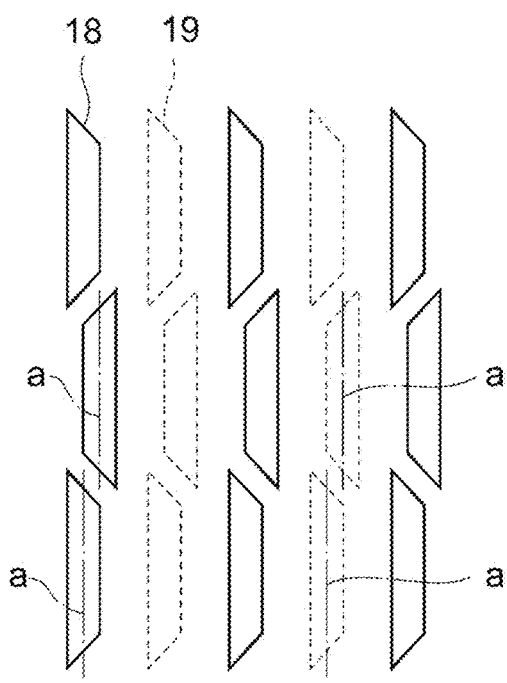
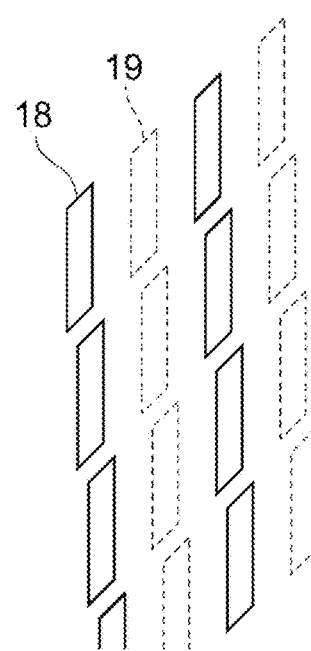
Fig. 2C              Fig. 2D

LIQUID CRYSTAL DISPLAY APPARATUS

BACKGROUND OF THE INVENTION

Field of the Invention

The present invention relates to a liquid crystal display apparatus comprising an electrode with a plurality of openings.

Description of the Background Art

Japanese Unexamined Patent Application Publication No. 2004-252298 (hereinafter referred to as Patent Document 1) discloses a liquid crystal display apparatus wherein a plurality of openings (slits) is respectively provided to transparent electrodes disposed facing each other, sandwiching a liquid crystal layer. In this liquid crystal display apparatus, a fringe electric field (an oblique electric field) is generated in two different directions by an action of each opening, and applied to the liquid crystal layer, thereby causing a dual-domain alignment structure to be produced in the liquid crystal layer. As a result, viewing angle dependency is improved, making it possible to decrease the viewing angle dependency of the display region as a whole. Further, Japanese Unexamined Patent Application Publication No. 2009-122271 (hereinafter referred to as Patent Document 2) discloses a liquid crystal display apparatus that improves display uniformity by making the spacing between openings adjacent in the longitudinal direction smaller than a width (length in a width direction) of each opening in a liquid crystal display apparatus such as described above.

However, during the manufacture of a liquid crystal display apparatus such as described above, a variance in etching accuracy when patterning the large number of openings can lead to a defect wherein a portion of openings join together in respective longitudinal directions, causing disconnection in the electrode. Possible solutions for this include decreasing the etching rate by changing the etching solution and settings such as the processing temperature. Nevertheless, a decrease in the etching rate decreases the production efficiency of the liquid crystal display apparatus, and is therefore not preferable.

On the other hand, if the longitudinal direction spacing between openings is set larger, it becomes easier to prevent the disconnection resulting from the openings joining together even if the etching rate is not decreased. As disclosed in Patent Document 2 described above, however, to improve the display uniformity of the liquid crystal display apparatus, the width of the openings must also be increased in association with setting the longitudinal direction spacing between openings larger. However, the effective aperture ratio of the display part of the liquid crystal display apparatus decreases in proportion to the increase in the width of the opening, making this corrective measure not preferable as well.

It is therefore an object of the specific aspects according to the present invention to provide a technique that prevents electrode disconnection in a liquid crystal display apparatus comprising a plurality of openings in an electrode.

SUMMARY OF THE INVENTION

The liquid crystal display apparatus according to an aspect of the present invention is a liquid crystal display apparatus comprising (a) a first substrate and a second substrate disposed facing each other, (b) a first electrode provided to the first substrate, (c) a second electrode provided to the second substrate, and (d) a liquid crystal layer disposed between the first substrate and the second substrate, wherein: (e) the first electrode comprises a plurality of first openings in at least a region that overlaps with the second electrode, (f) the second electrode comprises a plurality of second openings in at least a region that overlaps with the first electrode, (g) each of the plurality of first openings is disposed forming a plurality of columns so that the respective longitudinal directions align with a first direction, and comprises two short-side edges that obliquely cross the first direction at an angle other than orthogonal, (h) each of the plurality of second openings is disposed forming a plurality of columns so that the respective longitudinal directions align with the first direction, and comprises two short-side edges that obliquely cross the first direction at an angle other than orthogonal, and (i) the plurality of first openings and the plurality of second openings are alternately disposed column by column along a second direction that crosses the first direction.

According to the above described configuration, even in a case where the width of each opening is narrowed to raise the aperture ratio, each short-side edge is configured so as to obliquely cross the longitudinal direction of each opening, making it possible to make each short-side edge longer compared to a case where each short-side edge is made to orthogonally cross the longitudinal direction of each opening. Accordingly, the distance between openings adjacent in the longitudinal direction can be further increased, making it possible to prevent electrode disconnection resulting from the openings joining together.

Preferably, in the above described liquid crystal display apparatus, for example, the two short-side edges of each of the plurality of first openings are directed in the same direction, and the two short-side edges of each of the plurality of second openings are directed in the same direction. In this case, the disposed direction of the two short-side edges of each of the plurality of first openings, and the disposed direction of the two short-side edges of each of the plurality of second openings may differ.

Further, preferably, in the above described liquid crystal display apparatus, for example, the two short-side edges of each of the plurality of first openings are directed in different directions and the neighboring short-side edges of openings adjacent in the first direction are directed in the same direction; and the two short-side edges of each of the plurality of second openings are directed in different directions and the neighboring short-side edges of openings adjacent in the first direction are directed in the same direction.

Further, preferably, in the above described liquid crystal display apparatus, each of the plurality of first openings and the plurality of second openings comprises a recess in the middle area in the longitudinal direction, in the planar view.

As a result, it is possible to further raise the aperture ratio.

BRIEF DESCRIPTION OF THE DRAWINGS

FIGS. 2A-2D are plan views showing a structure examples of the respective openings.

DESCRIPTION OF THE PREFERRED EMBODIMENTS

The following describes embodiments of the present invention with reference to drawings.

Figure 1:
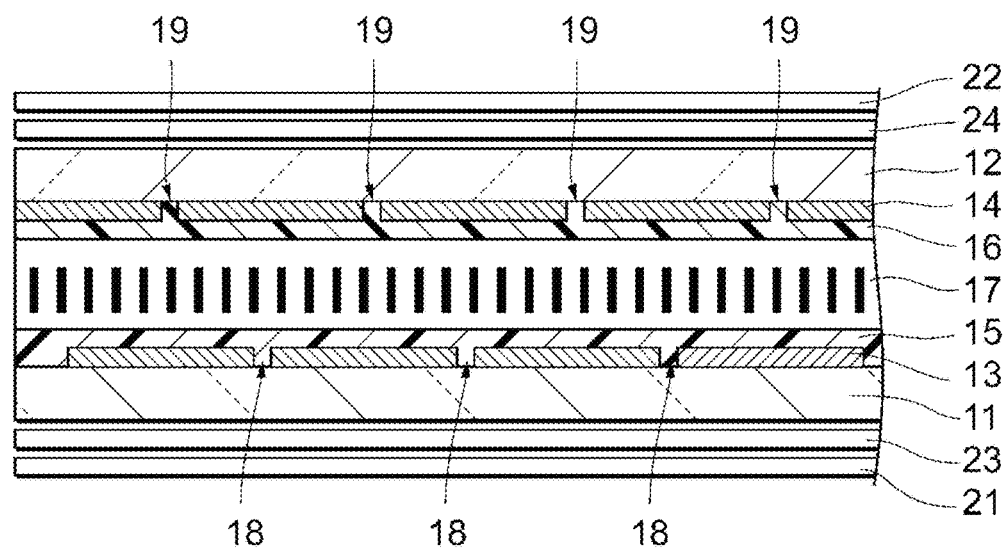
FIG. 1 is a cross-sectional view showing the basic structure of the liquid crystal display apparatus of an embodiment.

FIG. 1 is a cross-sectional view showing the basic structure of the liquid crystal display apparatus of an embodiment. This liquid crystal display apparatus comprises a first substrate 11 and a second substrate 12 disposed facing each other, a first electrode 13 provided to the first substrate 11, a second electrode 14 provided to the second substrate 12, and a liquid crystal layer 17 disposed between the first substrate 11 and the second substrate 12, as a basic configuration. For example, the liquid crystal display apparatus of this embodiment is configured so that the region where the electrodes overlap each other forms the characters and designs that the user wants to display, is basically capable of displaying only predetermined characters and the like, and is a segment display type liquid crystal display apparatus wherein generally a region of about 50% or less in terms of the area ratio inside the effective display region contributes to the display of characters and the like. Note that the liquid crystal display apparatus may be a dot matrix display type wherein a plurality of pixels is arranged in a matrix pattern, or may include both a segment display type and a dot matrix display type.

The first substrate 11 and the second substrate 12 are each a transparent substrate, such as a glass substrate, plastic substrate, or the like, for example. As shown, the first substrate 11 and the second substrate 12 are bonded together with a predetermined gap (approximately 4 µm, for example) therebetween.

The first electrode 13 is provided to one surface side of the first substrate 11. Similarly, the second electrode 14 is provided to one surface side of the second substrate 12. The first electrode 13 and the second electrode 14 are each configured by suitably patterning a transparent conductive film, such as indium-tin oxide (ITO), for example. A plurality of openings 18 is provided to the first electrode 13 and a plurality of openings 19 is provided to the second electrode 14.

A first alignment film 15 is provided to one surface side of the first substrate 11 so as to cover the first electrode 13. A second alignment film 16 is provided to one surface side of the second substrate 12 so as to cover the second electrode 14. A vertical alignment film that restricts the alignment of the liquid crystal layer 17 to a vertical alignment is used as the first alignment film 15 and the second alignment film 16. A uniaxial alignment process such as a rubbing process is not performed on either of the alignment films 15 or 16.

The liquid crystal layer 17 is provided between the first substrate 11 and the second substrate 12. In this embodiment, the liquid crystal layer 17 is configured using a liquid crystal material with a negative dielectric anisotropy $\Delta\epsilon$. The bold lines shown in the liquid crystal layer 17 schematically indicate the direction of alignment of the liquid crystal molecules in the liquid crystal layer 17. The liquid crystal layer 17 of this embodiment is set in a vertical alignment in which the direction of alignment of the liquid crystal molecules when a voltage is not applied is vertical with respect to each substrate surface of the first substrate 11 and the second substrate 12.

A first polarizer 21 is disposed on the outside of the first substrate 11. Similarly, a second polarizer 22 is disposed on the outside of the second substrate 12. The first polarizer 21 and the second polarizer 22 are disposed so that the respective absorption axes are substantially perpendicular to each other. Further, an optical compensator, such as a C plate, may be suitably disposed between each polarizer and each substrate. For example, according to this embodiment, optical compensators 23 and 24 are disposed between the first substrate 11 and the first polarizer 21, and between the second substrate 12 and the second polarizer 22, respectively.

FIGS. 2A-2D, FIGS. 3A-3D, FIGS. 4A-4E are plan views showing a structure examples of the respective openings. The following describes in detail, the structure of respective openings 18 and 19 in a planer view, with reference to each of the drawings.

Each of the openings 18 in the structure example shown in FIG. 2A comprises two long-side edges along the vertical direction (first direction) of the page, and two short-side edges that obliquely cross (cross at an angle other than orthogonal) these long-side edges, and has a substantially parallelogram planar view shape that extends in the vertical direction. In this example, each short-side edge is disposed toward a direction rotated 45° clockwise using the vertical direction as reference and obliquely crosses each long-side edge, one short-side edge joins the respective one end sides of the two long-side edges, and the other short-side edge joins the respective other end sides of the two long-side edges.

The respective openings 18 are disposed forming columns so that the respective longitudinal directions align with the vertical direction. Hence, the longitudinal direction of the opening is generally the disposed direction of the longest sides of the plurality of sides that demarcate the outer shape of the opening (hereinafter the same). Further, each of the openings 19 also comprises a shape similar to that of each of the openings 18, and is similarly disposed. Then, the respective openings 18 and the respective openings 19 are alternately disposed along the horizontal direction (second direction). When attention is focused on a certain opening 18, this opening 18 is sandwiched between two of the openings 19 respectively disposed in the horizontal direction. Similarly, when attention is focused on a certain opening 19, this opening 19 is sandwiched between two of the openings 18 respectively disposed in the horizontal direction. From a different viewpoint, the respective openings 18 and the respective openings 19 are each divided, sandwiching an electrode connecting part cyclically disposed in the vertical direction (hereinafter the same).

Each of the openings 18 in the structure example shown in FIG. 2B comprises a shape similar to that of each of the openings 18 shown in FIG. 2A, and is similarly disposed. Each of the openings 19 in the structure example shown in FIG. 2B is disposed similarly to that of each of the openings 19 shown in FIG. 2A, but the shape is different. Specifically, each short-side edge of the openings 19 is disposed toward a direction rotated 45° counterclockwise using the vertical direction as reference and obliquely crosses each long-side edge, one short-side edge joins the respective one end sides of the two long-side edges, and the other short-side edge joins the respective other end sides of the two long-side edges. And each of the openings 19 has a substantially parallelogram planar view shape that extends in the vertical direction.

Each of the openings 18 in the structure example shown in FIG. 2C comprises two long-side edges along the vertical direction, and two short-side edges that obliquely cross these long-side edges, and has a substantially trapezoid planar view shape that extends in the vertical direction. In this example, one short-side edge of each short-side edge is disposed toward a direction rotated 45° clockwise using the vertical direction as reference and obliquely crosses each long-side edge and joins the respective other end sides of the two long-side edges. And the other short-side edge of each short-side edge is disposed toward a direction rotated 45° counterclockwise using the vertical direction as reference and obliquely crosses each long-side edge and joins the respective other end sides of the two long-side edges. Further, each of the openings 19 also comprises a shape similar to that of each of the openings 18, and is similarly disposed.

Further, the respective openings 18 are disposed so that the orientation of the openings adjacent in the longitudinal direction is reversed to the horizontal direction, and columns are formed so that the respective longitudinal directions align with the vertical direction. Hence, each of the openings 18 is disposed so that the positions of the two long-side edges (in other words, the position of a center line a between the long-side edges) of openings adjacent in the longitudinal direction are (is) shifted in the horizontal direction. This is a structure for more reliably preventing the openings adjacent in the longitudinal direction from joining together. The amount of shift is preferably an amount less than the width (the length between the long-side edges) of each of the openings 18. Further, the respective approximal short-side edges of openings in close proximity in the longitudinal direction are parallel and set so that, when one of the openings 18 is moved in parallel in a direction rotated 45° with respect to the longitudinal direction, the short-side edges overlap with the other opening 18. Further, each of the openings 19 also comprises a shape similar to that of each of the openings 18, and is similarly disposed.

Further, the respective openings 18 and the respective openings 19 are alternately disposed along the horizontal direction. When attention is focused on a certain opening 18, this opening 18 is sandwiched between two of the openings 19 respectively disposed in the horizontal direction. The one opening 18 and the two openings 19 sandwiching this opening 18 at this time are disposed in the same orientation. Similarly, when attention is focused on a certain opening 19, this opening 19 is sandwiched between two of the openings 18 respectively disposed in the horizontal direction. The one opening 19 and the two openings 18 sandwiching this opening 19 at this time are disposed in the same orientation.

Note that in the respective openings 18 and the respective openings 19 shown in FIG. 2C, the positions of the two long-side edges (the position of the center line a between the long-side edges) of the openings adjacent in the longitudinal direction do (does) not need to be shifted in the horizontal direction.

The respective openings 18 and the respective openings 19 in the structure example shown in FIG. 2D have the same shape as and differ in disposition from the respective openings in the case of FIG. 2A described above. Specifically, the respective openings 18 and the respective openings 19 are each disposed so that the positions of the two long-side edges of the openings adjacent in the longitudinal direction are shifted in the horizontal direction, similar to the structure example shown in FIG. 2C. Further, the respective approximal short-side edges of openings in close proximity in the longitudinal direction are parallel and set so that, when one of the openings 18 (or 19) is moved in parallel in a direction rotated 45° with respect to the longitudinal direction, the short-side edges overlap with the other opening 18 (or 19). Further, the respective openings 18 and the respective openings 19 are alternately disposed so that the respective openings adjacent in the direction parallel to the short-side edge form columns and, as a whole, are disposed so that a plurality of columns is formed to the upward right in the example shown.

Figure 3A:
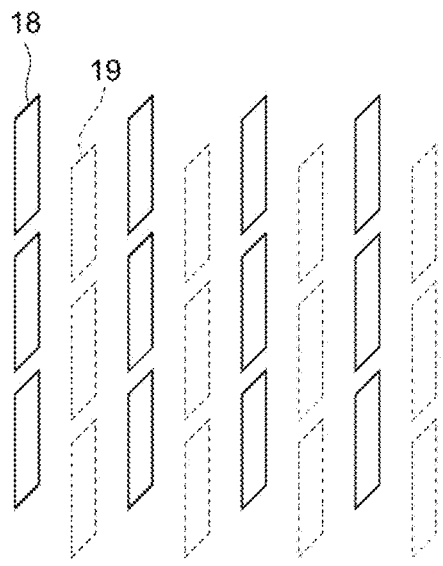
FIGS. 3A-3D are plan views showing a structure examples of the respective openings.

The respective openings 18 and the respective openings 19 in the structure example shown in FIG. 3A have the same shape as and differ in disposition from the respective openings in the case of FIG. 2A described above. Specifically, the disposed pitch of the opening 18 and opening 19 adjacent in the horizontal direction is shifted by a half pitch in the vertical direction. From a different viewpoint, each of the electrode connecting parts that serves as a region that divides the area between two of the openings 18 adjacent in the vertical direction, and each of the electrode connecting parts that serves as a region that divides the area between two of the openings 19 adjacent in the vertical direction are shifted from each other by a half pitch in the vertical direction. Note that the amount of shift is arbitrary and not limited to a half pitch.

Figure 3B:
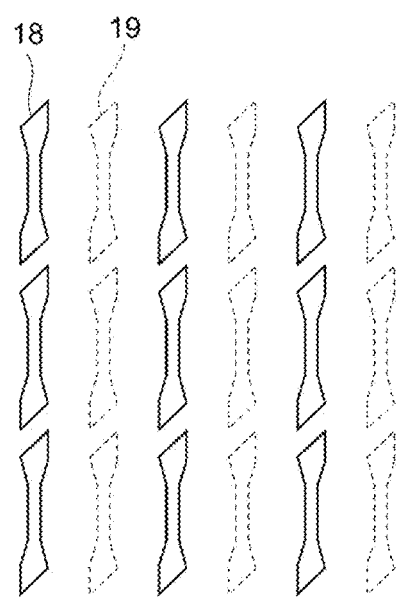

The respective openings 18 and the respective openings 19 in the structure example shown in FIG. 3B have the same disposition as and differ in shape from the respective openings in the case of FIG. 2A described above. Specifically, the respective openings 18 and the respective openings 19 each comprise a shape wherein the middle area in the longitudinal direction is recessed to the inside, in the planar view. With this arrangement, the surface areas of the respective openings 18 and the respective openings 19 become smaller, thereby achieving the advantage of improving the transmittance (that is, the aperture ratio) of the liquid crystal display apparatus. The alignment uniformity can also be maintained.

Figure 3C:
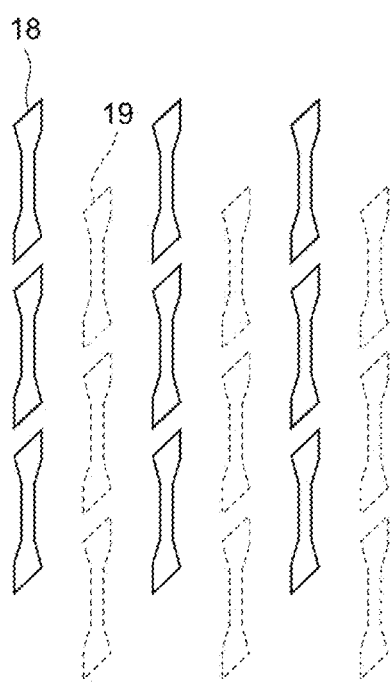

The respective openings 18 and the respective openings 19 in the structure example shown in FIG. 3C have the same shape as the respective openings in the case of FIG. 3B described above and have the same disposition as the respective openings in the case of FIG. 3A described above. When this structure is adopted, in the respective openings 18 and the respective openings 19, the sections where the widths of the openings adjacent in the short-side edge direction differ are alternately disposed with respect to the short-side edge direction, making the distance between the openings adjacent in the width direction relatively uniform even if there is a recess to the inside in the longitudinal direction. As a result, the disposition efficiency of the respective openings 18 and the respective openings 19 increases, making it possible to decrease the disposed surface area of the opening per unit surface area.

Figure 3D:
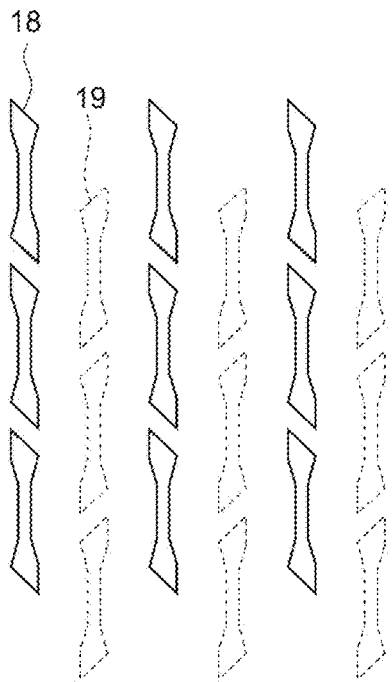

The respective openings 18 and the respective openings 19 in the structure example shown in FIG. 3D have the same disposition as the respective openings in the case of FIG. 3C described above, and the respective openings 18 and the respective openings 19 differ in shape. Specifically, the respective short-side edges of the openings 18 are disposed toward a direction rotated 45° counterclockwise using the vertical direction as reference, orthogonally crossing the respective long-side edges, and the respective short-side edges of the openings 19 are disposed toward a direction rotated 45° clockwise using the vertical direction as reference, orthogonally crossing the respective long-side edges. Further, the respective openings 18 and the respective openings 19 each comprise a shape wherein the middle area in the longitudinal direction is recessed to the inside, in the planar view.

Figure 4A:
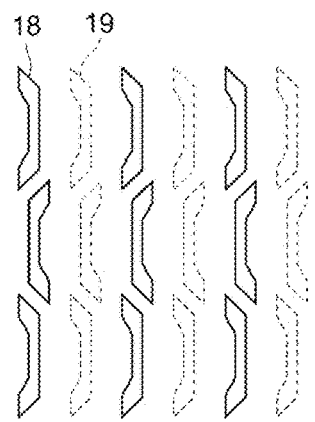
FIGS. 4A-4E are plan views showing a structure examples of the respective openings.

The respective openings 18 and the respective openings 19 in the structure example shown in FIG. 4A have the same disposition as the respective openings in the case of FIG. 2C described above, and the respective openings differ in shape. Specifically, the respective openings 18 and the respective openings 19 each comprise a recess to the inside on one side in the longitudinal direction. The positions of the above described recesses of the respective openings 18 adjacent in the vertical direction are alternately disposed on the right side and the left side. Similarly, the positions of the above described recesses of the respective openings 19 adjacent in the vertical direction are alternately disposed on the right side and the left side. Further, the positions of the recesses of the openings 18 and the openings 19 adjacent in the horizontal direction are disposed on the same side. Note that, in the respective openings 18 and the respective openings 19, the recess section may be provided to both left and right sides.

Figure 4B:
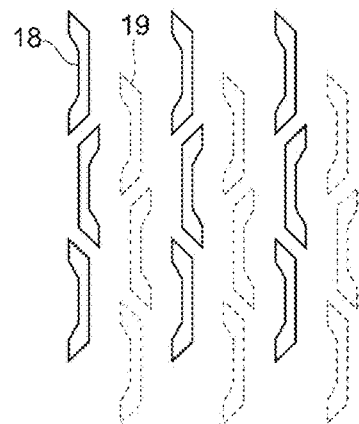

The respective openings 18 and the respective openings 19 in the structure example shown in FIG. 4B have the same shape as the respective openings in the case of FIG. 4A described above and have the same disposition as the respective openings in the case of FIG. 3A described above. That is, in the structure example shown in FIG. 4A, the position of the opening 18 of a certain column and the position of the opening 19 of the column adjacent thereto are shifted by a predetermined pitch (a half pitch in the example shown).

Figure 4C:
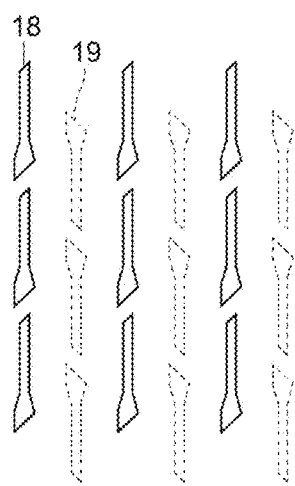

The respective openings 18 and the respective openings 19 in the structure example shown in FIG. 4C are modifications of the structure example shown in FIG. 3C described above, wherein the positions of the respective openings are the same, but the shapes differ. Specifically, in the respective openings 18 and the respective openings 19 here, the respective widths of one end side and the other end side in the longitudinal direction differ. With this arrangement, it is possible to further improve transmittance.

Figure 4D:
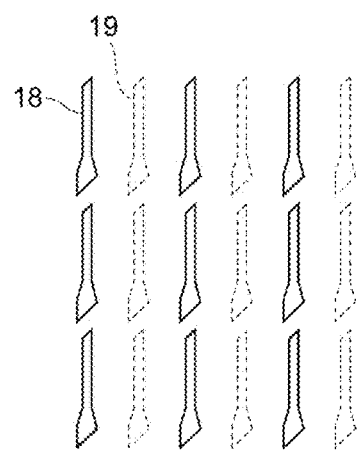

The respective openings 18 and the respective openings 19 in the structure example shown in FIG. 4D are modifications of the structure example shown in FIG. 4C described above, wherein the dispositions of respective openings 18 and the respective openings 19 are the same as the respective openings in the case of FIG. 2A.

Figure 4E:
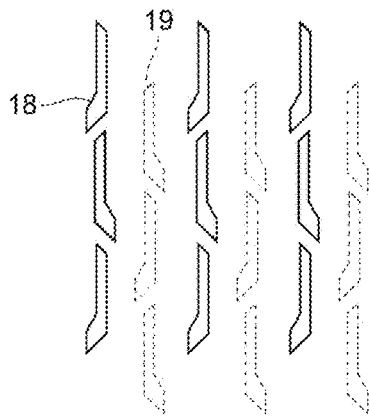

The respective openings 18 and the respective openings 19 in the structure example shown in FIG. 4E are modifications of the structure example shown in FIG. 4C described above, wherein the positions of respective openings 18 and the respective openings 19 are the same as and differ in shape from the respective openings in the case of FIG. 4C. Specifically, in the respective openings 18 and the respective openings 19, the widths of one end side and the other end side differ, and one left or right edge is in the shape of the line while the other edge is in the shape of a polygonal line. With this arrangement, it is possible to further improve transmittance.

(Execution Examples)

Next, execution examples related to several of the structure examples described above will be described.

Figure 5A:
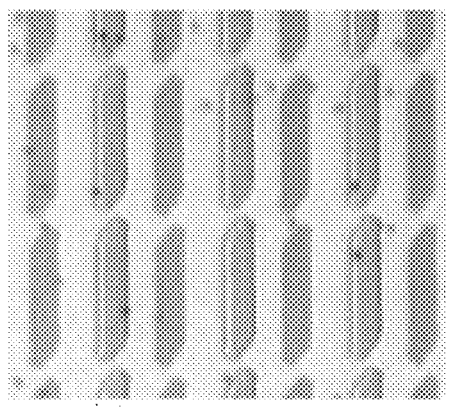
FIG. 5A is a microscope image of an execution example wherein the first substrate and second substrate comprising the respective openings in the structure example shown in FIG. 2A described above are bonded together, with the liquid crystal layer not yet formed (a so-called empty cell).
Figure 5B:
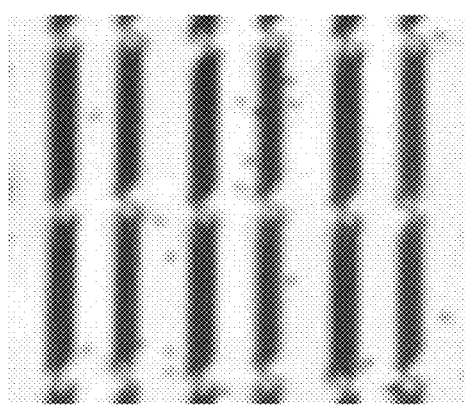
FIG. 5B is an image of the alignment texture of an execution example during a light display of the embodiment with the liquid crystal layer formed.
Figure 7:
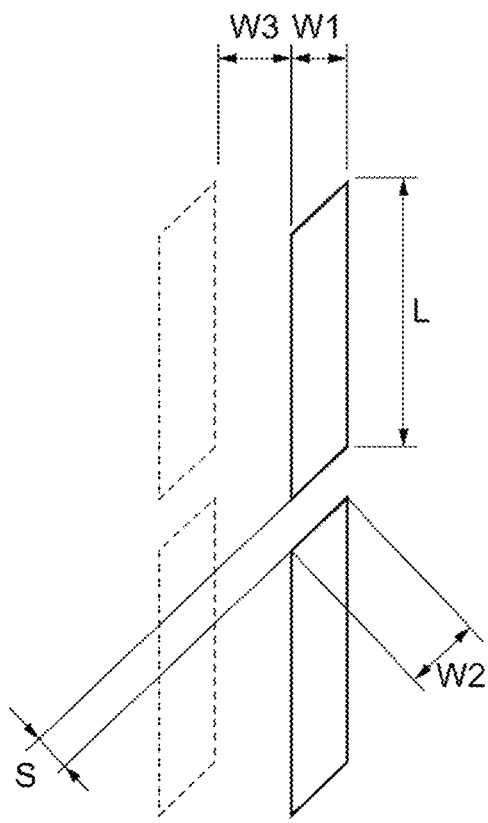
FIG. 7 shows the definitions of the shape parameters of the respective openings.

FIG. 5A is a microscope image of an execution example wherein the first substrate and second substrate comprising the respective openings in the structure example shown in FIG. 2A described above are bonded together, with the liquid crystal layer not yet formed (a so-called empty cell). FIG. 7 shows the definitions of the shape parameters of the respective openings (hereinafter the same). Here, a cell thickness was set to 4 µm, a slit length L was set to 100 µm, a slit width W1 (a length between the long-side edges of one of the openings) was set to 20 µm, a short-side edge length W2 was set to 28 µm, a distance W3 between the long-side edges of the openings was set to 30 µm, and a distance S between the short-side edges of the openings was set to 10 µm. Note that the slit length L is defined as the average of both long-side edges (in this example, both long-side edges are equal). Observation of the edges of the divided sections of the respective openings reveals that the connecting locations of the two long-side edges and the short-side edges that obliquely cross these edges form an obtuse angle and acute angle, but the angles are rounded due to the effect of etching accuracy, forming curves. However, the image shows that the tangent of the curved section of the short-side edge and the average direction of the linear section clearly obliquely cross the longitudinal direction of the respective openings. FIG. 5B is an image of the alignment texture of an execution example during a light display of the embodiment with the liquid crystal layer formed. The alignment between openings adjacent in the horizontal direction is uniform due to the generation of the fringe electric field. Further, with regard to the alignment between openings adjacent in the vertical direction, a regular cross-shaped dark region is observed, revealing that this dark region is uniform in all regions. The liquid crystal display apparatus in this embodiment confirms a favorable display in appearance observation.

Figure 5C:
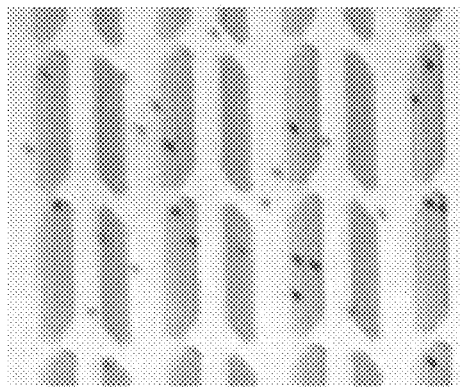
FIG. 5C is a microscope image of an execution example wherein the first substrate and second substrate comprising the respective openings in the structure example shown in FIG. 2B described above are bonded together, with the liquid crystal layer not yet formed (a so-called empty cell).
Figure 5D:
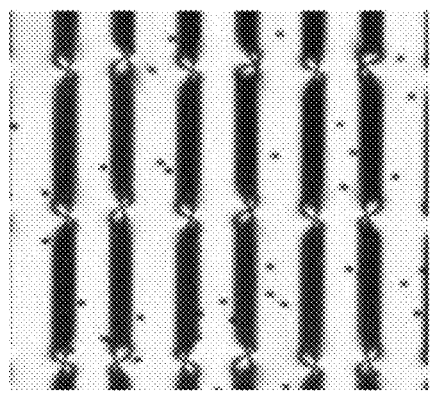
FIG. 5D is an image of the alignment texture of an execution example during a light display of the embodiment with the liquid crystal layer formed.

FIG. 5C is a microscope image of an execution example wherein the first substrate and second substrate comprising the respective openings in the structure example shown in FIG. 2B described above are bonded together, with the liquid crystal layer not yet formed (a so-called empty cell). The numerical values of the shape parameters of the respective openings are similar to those described above. Observation of the edges of the divided sections of the respective openings reveals that the angles are rounded due to the effect of etching accuracy, forming curves, but the image shows that the tangent of the curved section of the short-side edge and the average direction of the linear section clearly obliquely cross the longitudinal direction of the respective openings. Further, it is evident that the direction of the short-side edge alternately switches in the horizontal direction. FIG. 5D is an image of the alignment texture of an execution example during a light display of the embodiment with the liquid crystal layer formed. The alignment between openings adjacent in the horizontal direction is uniform due to the generation of the fringe electric field. Further, with regard to the alignment between openings adjacent in the vertical direction, a regular cross-shaped dark region is observed, revealing that this dark region is uniform in all regions. The liquid crystal display apparatus in this embodiment also confirms a favorable display in appearance observation.

Figure 6A:
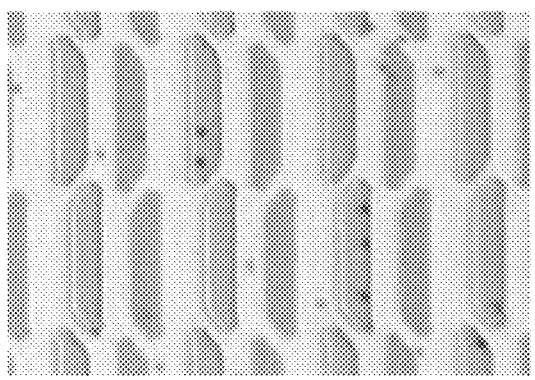
FIG. 6A is a microscope image of an execution example wherein the first substrate and second substrate comprising the respective openings in the structure example shown in FIG. 2C described above are bonded together, with the liquid crystal layer not yet formed (a so-called empty cell).
Figure 6B:
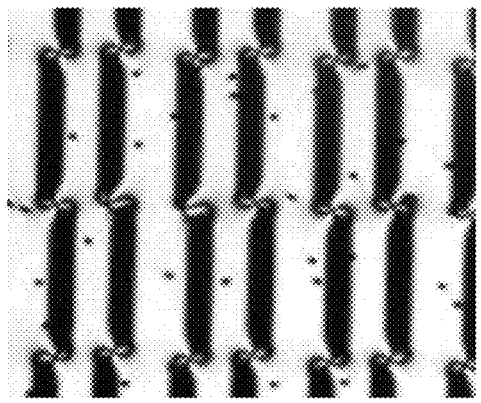
FIG. 6B is an image of the alignment texture of an execution example during a light display of the embodiment with the liquid crystal layer formed.

FIG. 6A is a microscope image of an execution example wherein the first substrate and second substrate comprising the respective openings in the structure example shown in FIG. 2C described above are bonded together, with the liquid crystal layer not yet formed (a so-called empty cell). The numerical values of the shape parameters of the respective openings are similar to those described above. Observation of the edges of the divided sections of the respective openings reveals that the angles are rounded due to the effect of etching accuracy, forming curves, but the image shows that the tangent of the curved section of the short-side edge and the average direction of the linear section clearly obliquely cross the longitudinal direction of the respective openings. Further, it is evident that the direction of the short-side edge alternately switches in the vertical direction. FIG. 6B is an image of the alignment texture of an execution example during a light display of the embodiment with the liquid crystal layer formed. The alignment between openings adjacent in the horizontal direction is uniform due to the generation of the fringe electric field. Further, with regard to the alignment between openings adjacent in the vertical direction, a regular cross-shaped dark region is observed, revealing that this dark region is uniform in all regions. The liquid crystal display apparatus in this embodiment also confirms a favorable display in appearance observation.

Figure 6C:
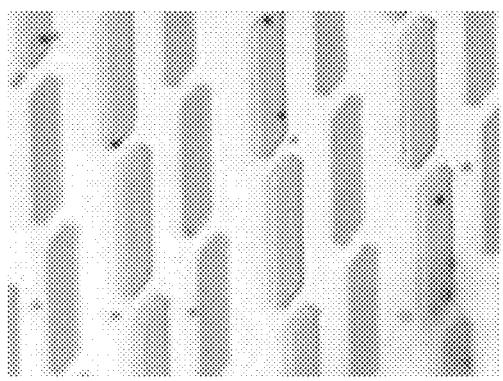
FIG. 6C is a microscope image of an execution example wherein the first substrate and second substrate comprising the respective openings in the structure example shown in FIG. 2D described above are bonded together, with the liquid crystal layer not yet formed (a so-called empty cell).
Figure 6D:
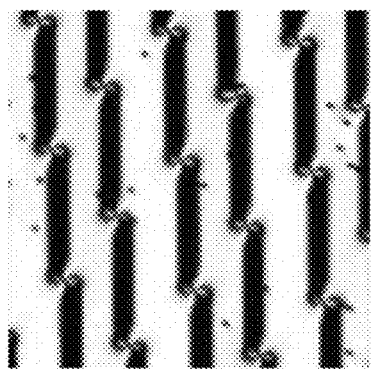
FIG. 6D is an image of the alignment texture of an execution example during a light display of the embodiment with the liquid crystal layer formed.

FIG. 6C is a microscope image of an execution example wherein the first substrate and second substrate comprising the respective openings in the structure example shown in FIG. 2D described above are bonded together, with the liquid crystal layer not yet formed (a so-called empty cell). The numerical values of the shape parameters of the respective openings are similar to those described above. Observation of the edges of the divided sections of the respective openings reveals that the angles are rounded due to the effect of etching accuracy, forming curves, but the image shows that the tangent of the curved section of the short-side edge and the average direction of the linear section clearly obliquely cross the longitudinal direction of the respective openings. Further, observations reveal that the center between the long-side edges shifts as the respective openings proceed vertically. FIG. 6D is an image of the alignment texture of an execution example during a light display of the embodiment with the liquid crystal layer formed. The alignment between openings adjacent in the horizontal direction is uniform due to the generation of the fringe electric field. Further, with regard to the alignment between openings adjacent in the vertical direction, a regular cross-shaped dark region is observed, revealing that this dark region is uniform in all regions. The liquid crystal display apparatus in this embodiment also confirms a favorable display in appearance observation.

According to the embodiments and execution examples described above, even in a case where the width of each opening is narrowed to raise the aperture ratio, each short-side edge is configured so as to obliquely cross the longitudinal direction of each opening, making it possible to make each short-side edge longer compared to a case where each short-side edge is made to orthogonally cross the longitudinal direction of each opening. Accordingly, the distance between openings adjacent in the longitudinal direction can be further increased, making it possible to prevent electrode disconnection resulting from the openings joining together.

Note that this invention is not limited to the subject matter of the foregoing embodiments, and can be implemented by being variously modified within the scope of the gist of the present invention.

What is claimed is:

1. A liquid crystal display apparatus comprising:
   a first substrate and a second substrate disposed facing each other;
   a first electrode provided on the first substrate;
   a second electrode provided on the second substrate; and
   a liquid crystal layer disposed between the first substrate and the second substrate;
   wherein the first electrode comprises a plurality of first openings in a region where the first electrode and the second electrode overlap each other;
   wherein the second electrode comprises a plurality of second openings in the region where the first electrode and the second electrode overlap each other;
   wherein the plurality of first openings are disposed forming a plurality of first columns so that respective longitudinal directions of the plurality of first openings align with a first direction, wherein each of the plurality of first openings comprises two short-side edges that obliquely cross the first direction at an angle other than orthogonal;
   wherein the plurality of second openings are disposed forming a plurality of second columns so that respective longitudinal directions of the plurality of second openings align with the first direction, wherein each of the plurality of second openings comprises two short-side edges that obliquely cross the first direction at an angle other than orthogonal;
   wherein the plurality of first openings and the plurality of second openings are alternately disposed column by column along a second direction that crosses the first direction;
   wherein a direction in which each of the two short-side edges of each of the plurality of first openings extends is the same as a direction in which each of the two short-side edges of each of the plurality of second openings extends; and
   wherein each short-side edge of each of the plurality of first and second openings extends in a straight line between corresponding long-side edges.

2. The liquid crystal display apparatus according to claim 1, wherein each of the plurality of first openings and the plurality of second openings comprises a recess in a middle area of the opening in the longitudinal direction, in planar view, such that a width of the opening in the middle area of the opening is narrower than a width of the opening in an end area of the opening in the longitudinal direction.

3. A liquid crystal display apparatus comprising:
   a first substrate and a second substrate disposed facing each other;
   a first electrode provided on the first substrate;
   a second electrode provided on the second substrate; and
   a liquid crystal layer disposed between the first substrate and the second substrate;
   wherein the first electrode comprises a plurality of first openings in a region where the first electrode and the second electrode overlap each other;

wherein the second electrode comprises a plurality of second openings in the region where the first electrode and the second electrode overlap each other;

wherein the plurality of first openings are disposed forming a plurality of first columns so that respective longitudinal directions of the plurality of first openings align with a first direction, wherein each of the plurality of first openings comprises two short-side edges that obliquely cross the first direction at an angle other than orthogonal;

wherein the plurality of second openings are disposed forming a plurality of second columns so that respective longitudinal directions of the plurality of second openings align with the first direction, wherein each of the plurality of second openings comprises two short-side edges that obliquely cross the first direction at an angle other than orthogonal;

wherein the plurality of first openings and the plurality of second openings are alternately disposed column by column along a second direction that crosses the first direction;

wherein a direction in which each of the two short-side edges of each of the plurality of first openings extends is different from a direction in which each of the two short-side edges of each of the plurality of second openings extends;

wherein a first clockwise angle formed by the first direction and the direction in which each of the two short-side edges of each of the plurality of first openings extends, is equal to a second counterclockwise angle formed by the first direction and the direction in which each of the two short-side edges of each of the plurality of second openings extends; and wherein each short-side edge of each of the plurality of first and second openings extends in a straight line between corresponding long-side edges.

4. The liquid crystal display apparatus according to claim 3, wherein each of the plurality of first openings and the plurality of second openings comprises a recess in a middle area of the opening in the longitudinal direction, in planar view, such that a width of the opening in the middle area of the opening is narrower than a width of the opening in an end area of the opening in the longitudinal direction.

5. A liquid crystal display apparatus comprising: a first substrate and a second substrate disposed facing each other; a first electrode provided on the first substrate; a second electrode provided on the second substrate; and a liquid crystal layer disposed between the first substrate and the second substrate; wherein the first electrode comprises a plurality of first openings in a region where the first electrode and the second electrode overlap each other; wherein the second electrode comprises a plurality of second openings in the region where the first electrode and the second electrode overlap each other; wherein the plurality of first openings are disposed forming a plurality of first columns so that respective longitudinal directions of the plurality of first openings align with a first direction, wherein each of the plurality of first openings comprises two short-side edges that obliquely cross the first direction at an angle other than orthogonal; wherein the plurality of second openings are disposed forming a plurality of second columns so that respective longitudinal directions of the plurality of second openings align with the first direction, wherein each of the plurality of second openings comprises two short-side edges that obliquely cross the first direction at an angle other than orthogonal; wherein the plurality of first openings and the plurality of second openings are alternately disposed column by column along a second direction that is orthogonal to the first direction; wherein the two short-side edges of each of the plurality of first openings are directed in different directions and are symmetrical in relation to the second direction and wherein respective neighboring short-side edges, which are of adjacent first openings that are from among the plurality of first openings and that are adjacent in the first direction, are parallel, wherein the neighboring short-side edges respectively belong to the adjacent first openings; wherein the two short-side edges of each of the plurality of second openings are directed in different directions and are symmetrical in relation to the second direction and wherein respective neighboring short-side edges, which are of adjacent second openings that are from among the plurality of second openings and that are adjacent in the first direction, are parallel, wherein the neighboring short-side edges respectively belong to the adjacent second openings; wherein a first angle formed by a direction in which one of the two short-side edges of each of the plurality of first openings extends and the second direction, is equal to a second angle formed by a direction of each in which a corresponding one of the two short-side edges of each of the plurality of second openings extends and the second direction; wherein a third angle formed by a direction in which the other of the two short-side edges of each of the plurality of first openings extends and the second direction, is equal to a fourth angle formed by a direction in which the other of the two short-side edges of each of the plurality of second openings extends and the second direction; and wherein each short-side edge of each of the plurality of first and second openings extends in a straight line between corresponding long-side edges.

6. The liquid crystal display apparatus according to claim 5, wherein each of the plurality of first openings and the plurality of second openings comprises a recess in a middle area of the opening in the longitudinal direction, in planar view, such that a width of the opening in the middle area of the opening is narrower than a width of the opening in an end area of the opening in the longitudinal direction.

* * * * *